United States Patent
Schweid et al.

(10) Patent No.: US 6,535,633 B1
(45) Date of Patent: Mar. 18, 2003

(54) METHOD AND APPARATUS FOR RE-CLASSIFYING COLOR IMAGE PIXELS CLASSIFIED BY SINGLE CHANNEL SEGMENTATION

(75) Inventors: Stuart A. Schweid, Pittsford, NY (US); Jeng-nan Shiau, Webster, NY (US)

(73) Assignee: Bank One, Chicago, IL (US)

( * ) Notice: Subject to any disclaimer, the term of this patent is extended or adjusted under 35 U.S.C. 154(b) by 0 days.

(21) Appl. No.: 09/405,712

(22) Filed: Sep. 24, 1999

(51) Int. Cl.[7] .................................................. G06K 9/00
(52) U.S. Cl. ...................... 382/165; 382/164; 382/167; 382/173; 382/180; 382/224; 358/515; 358/518
(58) Field of Search ................................. 382/162, 163, 382/164, 165, 167, 173, 180, 224; 358/515, 518

(56) References Cited

U.S. PATENT DOCUMENTS

| | | | |
|---|---|---|---|
| 5,293,430 A | | 3/1994 | Shiau et al. |
| 5,327,262 A | | 7/1994 | Williams |
| 5,341,226 A | | 8/1994 | Shiau |
| 5,550,569 A | * | 8/1996 | Wright .................... 347/15 |
| 5,588,072 A | * | 12/1996 | Wang ..................... 382/176 |
| 5,767,978 A | | 6/1998 | Revankar et al. |
| 5,802,203 A | | 9/1998 | Black et al. |
| 6,137,907 A | * | 10/2000 | Clark et al. .............. 382/180 |
| 6,282,317 B1 | * | 8/2001 | Luo et al. ................ 382/203 |

* cited by examiner

Primary Examiner—Phuoc Tran
Assistant Examiner—Ali Bayat

(57) ABSTRACT

A method and apparatus are provided for use in single channel segmentation of color images for reclassifying pixels which were inappropriately classified as belonging to a "black" or "white" class. The apparatus includes a re-classification circuit receiving first classification data generated by a single channel segmentation circuit operative to classify pixels of a multi-color channel input image. The re-classification circuit selectively re-classifies pixels that were previously classified by the single channel segmentation circuit into an "other" segmentation class based on a comparison of classification data associated with the pixels relative to a set of predefined classification data types. Particularly, the re-classification circuit reclassifies selected ones of the pixels into the "other" segmentation class when first classification data generated by the single channel segmentation circuit labels the pixels as a "white" or "black" data type.

13 Claims, 3 Drawing Sheets

METHOD AND APPARATUS FOR RE-CLASSIFYING COLOR IMAGE PIXELS CLASSIFIED BY SINGLE CHANNEL SEGMENTATION

BACKGROUND OF THE INVENTION

The present invention is directed to the art of digital image processing and, more particularly, to a method and apparatus for overriding segmentation classification information generated during single channel segmentation of a multi-channel color image. The present invention is especially well suited for addressing the white/black detection failure modes prevalent in single channel segmentation schemes by selectively re-classifying appropriate pixels as an "other" class and will be described with particular reference thereto. However, it is to be understood that the present invention has broader application and can be used to compensate for a wide range of segmentation failure modes and can be used with a wide variety of digital images and other digital information or data.

Segmentation is an important area of electronic image processing, particularly color image processing. In systems that use image segmentation information such as page description language (PDL) or other document description type systems, a plurality of predefined classes detected in compound documents are used for image storage, processing, rendering, and for other functions. The set of predefined classes includes text, halftone, contone, line art, picture, and many more. It is important, therefore, for the segmentation scheme used in classifying the color image to be able to correctly recognize and accurately identify pixels belonging to the set of classification groups supported by the PDL. That is, it is important for the segmentation technique to be matched to the document description system so that each pixel is classified as one of a plurality of predetermined recognized classification groups.

Sometimes, one or more pixels in a color image cannot be classified as belonging to one of the plurality of predetermined classification groups with a reasonable certainty. In that case, some prior art segmentation schemes label the indeterminate pixel as belonging to an "other" class. As an example, if a segmentation scheme can classify color image pixels as belonging to either a text or contone group only, and then halftone pixels are encountered in the digital color image, the segmentation processing would be unable to label the halftone pixels as either text or contone with a reasonable degree of certainty. One solution is to incorrectly label the halftone pixels as being either a text or contone type class even though the halftone pixel belongs to neither. Another solution is to merely label the halftone pixel as belonging to an "other" class whereupon similar pixels of indeterminate class must be further processed or handled in some unique manner. The use of the "other" class in color image segmentation schemes for identifying portions of an image having indeterminate classification characteristics has proven to be effective.

In more complicated segmentation schemes 10, such as the one shown at FIG. 1, each color space of a color input image 12 is processed by a separate independent full scale single channel segmentation processing unit that operates on each pixel of the multi-channel color input image simultaneously. In the example shown in FIG. 1, each pixel in the red color space R is processed by a first segmentation processing unit 14. Similarly, each pixel in the green and blue color spaces G, B is processed by an independent segmentation processing unit 16, 18, respectively. Each of the segmentation processing units generates a pixel classification output signal for use by a discriminator circuit 20 to appropriately label the processed pixel as belonging to one of a plurality of predetermined segmentation classes. In the segmentation scheme 10 shown in the figure, each segmentation processing unit operates simultaneously and in parallel to process individual pixels of the color input image 12 one at a time until each of the pixels are provided with an appropriate segmentation class tag for use downstream in the PDL.

Although the segmentation scheme 10 shown in FIG. 1 is fairly robust, it is quite complicated and somewhat costly to implement. Accordingly, a technique known as "single channel segmentation" for classifying pixels of color input images has been developed. FIG. 2 shows an example of a prior art single channel color image segmentation circuit 22. As illustrated there, only a single segmentation processing unit 24 is used to generate pixel classification signals for use by the discriminator circuit 26 to generate the appropriate pixel class tags. Typically, a single channel for input into the segmentation processing unit 24 is created from the multiple color channels, e.g. R, G, B of the color input image 28 using a technique known as projection. In projection, an inner product is determined between the multi-channel input video and a single predetermined direction. As an example, if the input video is an RGB image, the video value of each pixel can be represented by $V_{in}=[R_{in} G_{in} B_{in}]'$. A single channel for segmentation of the video, $S_V$, can be determined from $S_V=W'*V_{in}$ where W is a weighting vector: $W=[W_1 W_2 W_3]'$. In order to ensure that the output is limited to 8 bits, the weighing vector is typically normalized by $\Sigma_i w_i=1$.

One of the problems associated with single channel detection schemes is that occasionally very important information is lost during the conversion from three to one channel. As noted above, however, it is costly to include all three channels in performing segmentation. Accordingly, the single channel segmentation scheme shown in FIG. 2 is often employed where cost is a concern and where segmentation accuracy is not a major concern.

Typical prior art single channel segmentation schemes are prone to several failure modes including classifying certain bright colors (e.g. yellow) as the class "white" and certain dark colors (e.g. purple) as the class "black". White and black detection are the predominant failure modes. Typically, white is used as background in color images. Black is used as a key identifier in text recognition and to make decisions in certain compression schemes. In image processing, the white/color background class is very important. The black/white background class is used often to separate various regions within the color input image, for compression algorithms where background information (white/black class) is heavily compressed to separate windows within the color input image wherein the various windows are stored and/or processed independently or separately downstream and the like. White/black detection is therefore critical because failure to accurately identify background pixels in the color input image adversely affects image processing downstream.

With reference now to FIGS. 3a and 3b, one particularly acute failure mode of the single channel segmentation processing scheme will be described. As noted above, in single channel segmentation, a single channel projection vector is formed by generating a weighted vector of the three color channels into a single predetermined normalized output vector. When the plurality of color channels from the color input image are projected onto a single vector for processing, much of the color information may be lost from one or more of the color channels resulting in a single vector which essentially "looks" white to the segmentation processing unit 24. Essentially, color information critical to proper segmentation may be lost during the pre-segmentation processing. When this happens, a pixel is labeled as belonging to a "white" or "background" class in error. Accordingly, there is a need for overriding a white classification when color content information is obliterated in the pre-segmentation processing.

Another failure mode of the single channel segmentation scheme affects white and black detection as well. With reference to FIG. 3a, a color input image 30 includes a continuous color region 32 having a first color area 34 separated from a second color area 36 by a yellow line or bar 38. When the plurality of color channel vectors of the yellow halftone line portion 38 of the continuous halftone region 32 is projected onto a single vector, a white projection vector typically results. Thus, the yellow halftone area is inappropriately declared to be white. Green halftones can also have a large white component as well. In that case, a green halftone area in the continuous halftone region 34 would similarly likely be classified as background or white. Generally, colors within the green through yellow range project to a white or background composite vector.

In another example, shown in FIG. 3b, a halftone color sweep region 40 includes a yellow halftone sweep portion 42 and a green halftone sweep portion 44. During typical projection conversion of the plurality color channels to a single channel prior to segmentation, both the yellow halftone sweep portion 42 and the green halftone sweep portion 44 of the halftone color sweep region 40 would typically be interpreted as being background or white portions of the color input image because the projection of the orthogonal vectors onto a single projection vector masks much of the usable color information.

Accordingly, there is a need in single channel segmentation of color images for a method and apparatus for reclassifying pixels which were inappropriately classified as belonging to the "black" or "white/background" class. It would be advantageous to provide a method and apparatus that is relatively inexpensive and simple to implement which could selectively operate on the color input image pixels whenever the single channel segmentation scheme is likely to be operating in one of a plurality of known failure modes such as, for example, black/white detection.

It would be advantageous to provide an inexpensive secondary classification circuit which could perform very simple operations on the color input image pixel to override the primary segmentation circuit, if necessary, when the primary segmentation circuit is likely to be in one a set of known failure modes.

It would further be desirable to provide a method and apparatus to re-classify pixels that were previously inappropriately classified as background and/or white/black by a primary segmentation circuit.

SUMMARY OF THE INVENTION

In accordance with one aspect of the present invention, an inexpensive secondary classifier circuit is provide for generating "other" pixel class tags for use during single channel segmentation of color images.

In accordance with a more limited aspect of the present invention, the inexpensive secondary classifier circuit is responsive to a predetermined set of signals generated by the single channel segmentation circuit, preferably signals indicative of the segmentation circuit being in one of a plurality of known failure modes, such as white/black detection.

In accordance with a still further aspect of the invention, the secondary classifier circuit includes simple arithmetic and logic means for calculating information content of each color channel in the input image pixels and generating a classification override signal when the single channel segmentation circuit, misclassifies a pixel as being background and/or white/black.

A primary advantage of the invention is an accurate and efficient segmentation of input image pixels into classes.

It is another advantage of the invention is that performance results similar to multi-channel segmentation schemes are achieved with a substantially reduced hardware and software investment.

These and other advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
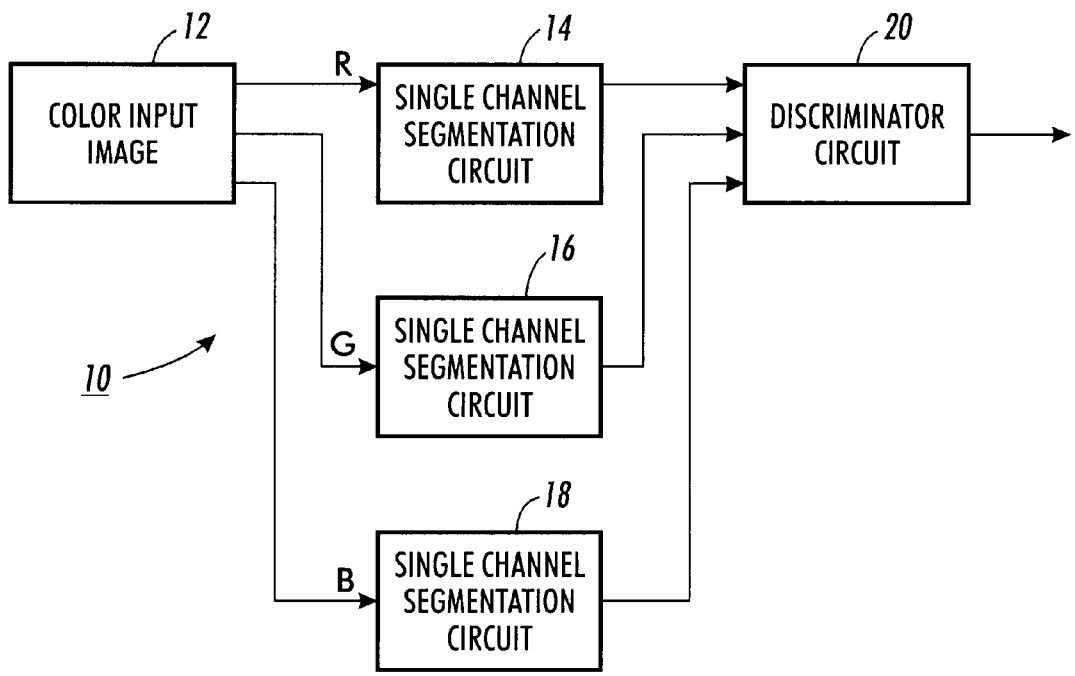
FIG. 1 is a schematic illustration of a prior art multi-channel color image segmentation scheme.
Figure 2:
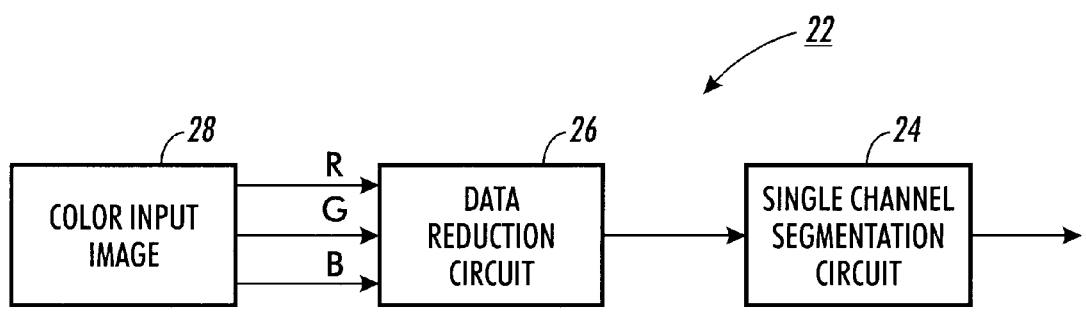
FIG. 2 is a schematic illustration of a prior art single channel color image segmentation circuit.
Figure 3A:
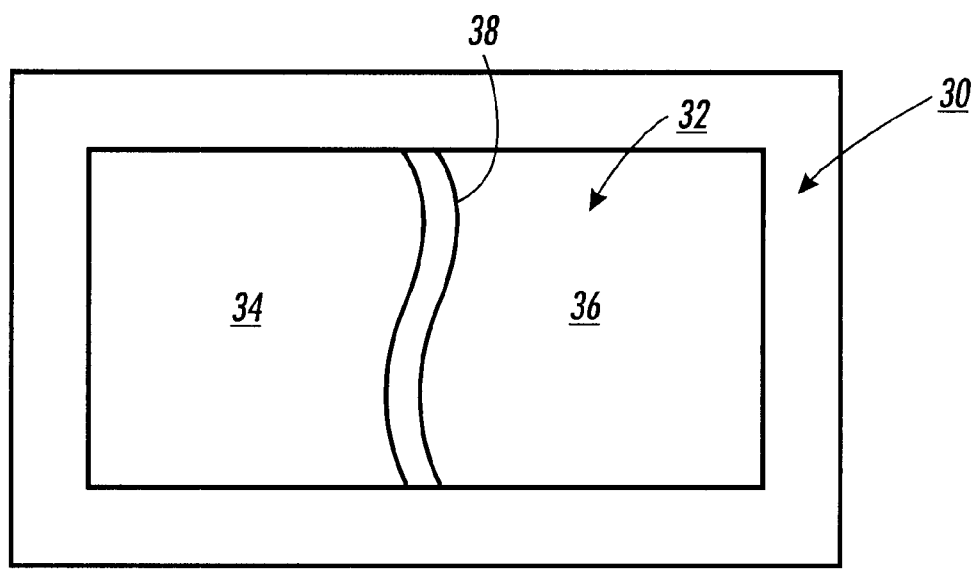
FIGS. 3a and 3b show yellow and/or green portions of a color input image which typically generates a failure mode in the prior art segmentation circuit shown in FIG. 2.
Figure 3B:
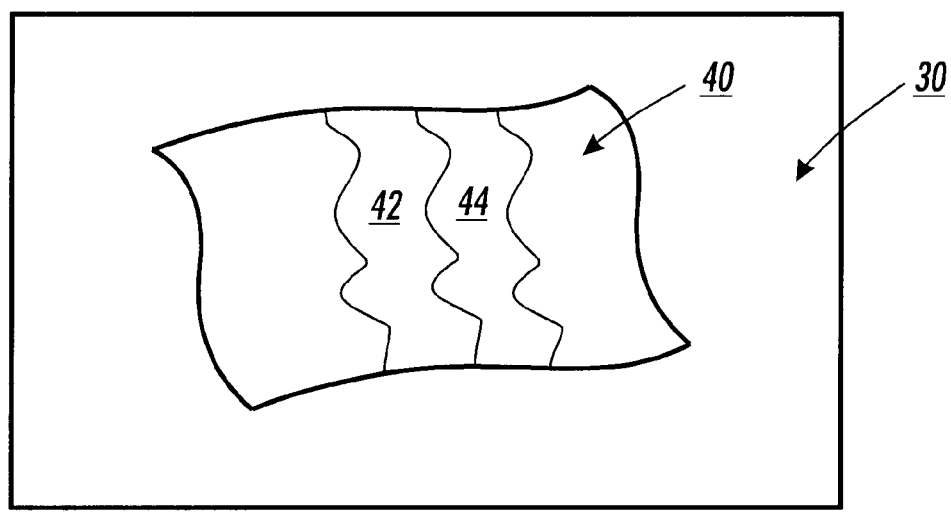
Figure 4:
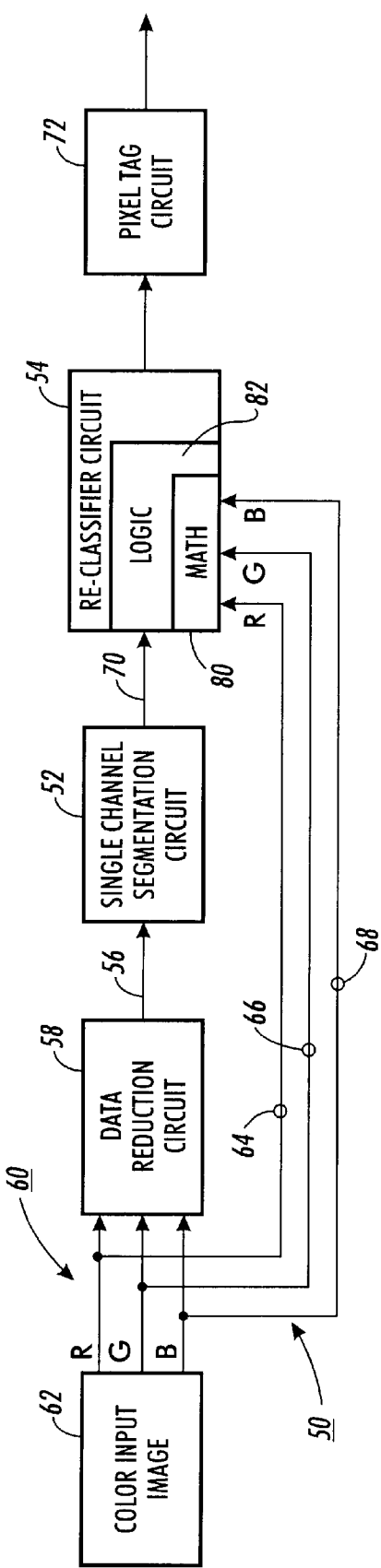
FIG. 4 is a schematic illustration of an apparatus for re-classifying color image pixels classified by single channel segmentation in accordance with a first preferred embodiment of the invention; and, FIG. 5 is a schematic illustration of a circuit for re-classifying color image pixels classified by single channel segmentation formed in accordance with a second preferred embodiment of the invention.

With reference now to FIG. 4, a first preferred embodiment of the present invention will be described. A segmentation circuit 50 with "other" class override is shown. The circuit 50 includes a full scale primary single channel segmentation circuit 52 and a secondary inexpensive re-classifier circuit 54. The single channel segmentation circuit 52 is known in the art and operates substantially as described above. To that end, the segmentation circuit 52 receives a single channel vector signal 56 from a data reduction circuit 58 based on multi-channel color image data 60 received from a color input image 62. In the preferred embodiment shown, the color image data 60 includes red channel data 64, green channel data 66, and blue channel data 68. The set of color input image channel data is converted into the single channel vector signal 56 by the data reduction circuit 58 using the projection techniques described generally above and well known to those skilled in the art. Essentially, however, the data reduction circuit 58 converts three input channels of color data to a single channel for processing by the primary single channel segmentation circuit 52.

As noted above, the primary single channel segmentation circuit 52 is susceptible to a set of failure modes which severely adversely affect image processing downstream. Although the failure modes are based in part by the projection weighting values used during the generation of the single projection vector in the data reduction circuit 58, one predominant failure mode of the single channel segmentation circuit 52 is white/black background detection. Accordingly, re-classification of pixels that are inappropriately classified as being background or white/black by the single channel segmentation circuit 52 is performed selectively as needed by the secondary re-classifier circuit 54.

The re-classifier circuit 54 is responsive to pixel class tag data 70 generated by the primary single channel segmentation circuit 52. Essentially, the re-classifier circuit 54 selectively delivers or gates one of either the pixel class tag data 70 from the primary single channel segmentation circuit 52 or pixel re-classification tag data generated by the classifier circuit 54. The gated segmentation tag data is delivered to a pixel class tag circuit 72 for use by the PDL (not shown).

More particularly, the re-classifier circuit 54 is responsive to a "black class" or a "white class" signal from the single channel segmentation circuit 52 to generate the pixel re-classify tag data in a manner to be described below. The re-classifier circuit 54 delivers the pixel class tag data 70 to the pixel class tag circuit 72 for all other segment classification data. In that way, the pixel class tag circuit 72 receives the output from the classifier circuit 54 whenever the primary single channel segmentation circuit 52 interprets the pixel class as being background or white/black and directly from the segmentation circuit 50 for all other segmentation classes. It is to be appreciated that white/black detection is a primary failure mode of the single channel segmentation circuit 52. The classifier circuit 54 is therefore disposed within the segmentation circuit 50 to compensate for the anticipated major failure modes of the single channel segmentation circuit 52.

The secondary classifier circuit 54 includes a math portion 80 and a logic portion 82. The math portion 80 compares each of the red, green, and blue video values from the color image data 60 against predetermined threshold values for each pixel of the color input image 12. The logic portion 82 is combined with the math portion 80 within the classifier circuit 54 to execute pixel re-classification processing according to the following:

if segment class is "white"
   if ($R_{in}$<White Threshold) class=other_light
   if ($G_{in}$<White Threshold) class=other_light
   if ($B_{in}$<White Threshold) class=other_light
else if segment class is "black"
   if ($R_{in}$>Black Threshold) class=other_dark
   if ($G_{in}$>Black Threshold) class=other_dark
   if ($B_{in}$>Black Threshold) class=other_dark According to the above, therefore, whenever the primary single channel segmentation circuit 52 generates a background or white/black detection signal, the re-classifier circuit 54 generates "other" segmentation data for use by the pixel class tag circuit 72. The pixel reclassification tag data is generated in accordance with the equation described above.

Figure 5:
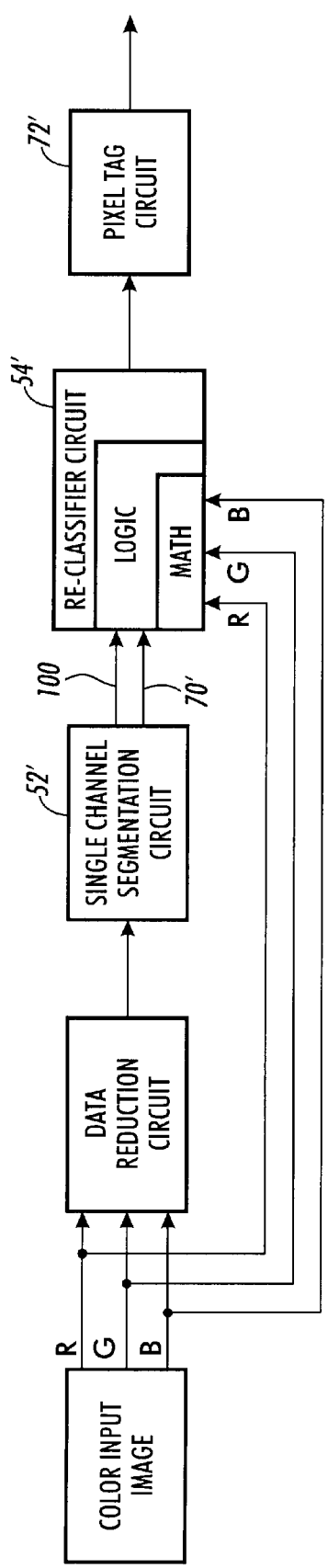

FIG. 5 shows a second embodiment of the invention wherein the primary single channel segmentation circuit 52' is adapted to generate an "other" class signal 100. Preferably, the segmentation circuit 52' generates the "other" signal 100 whenever a confidence value of the pixel class tag signal 70' is below a predetermined threshold value. In this embodiment, the re-classifier circuit 54' is responsive to the "other" signal 100 to generate and then route the pixel reclassify tag data directly to the class tag circuit 72' whenever the "other" signal 100 is generated by the single channel segmentation circuit 52'. In this embodiment, the single channel segmentation circuit 52' is adapted to initiate the pixel reclassification directly.

The invention has been described with reference to the preferred embodiments. Obviously, modifications and alterations will occur to others upon reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus for single channel segmentation of color images, the apparatus comprising:
   a data reduction circuit for converting a first set of pixels of a multi-channel color input image to a second set of pixels of a single channel representation of said multi-channel color input image;
   a single channel segmentation circuit operative to classify said second set of pixels into a plurality of segmentation classes by generating first classification data representative of said plurality of segmentation classes and associating said first classification data with each of said second set of pixels; and,
   a re-classification circuit receiving said first classification data and said first set of pixels of said multi-channel color input image, the re-classification circuit being adapted to selectively re-classify ones of said second set of pixels into an "other" segmentation class by generating second classification data representative of said "other" segmentation class and associating said second classification data with said ones of said second set of pixels.

2. The apparatus according to claim 1 wherein said re-classification circuit is adapted to re-classify said ones of said second set of pixels into said "other" segmentation class based on a comparison of said first classification data associated with said ones of said second set of pixels relative to a set of predefined classification data types.

3. The apparatus according to claim 2 wherein said re-classification circuit is adapted to re-classify said ones of said second set of pixels into said "other" segmentation class when said first classification data is a black/white background data type.

4. The apparatus according to claim 2 wherein:
   said single channel segmentation circuit is operative i) in a non-failure mode to classify said second set of pixels into a plurality of non-failure segmentation classes by generating said first classification data representative of said plurality of non-failure segmentation classes and associating said first classification data with each of said second set of pixels, and ii) in a failure mode to classify said second set of pixels into a plurality of failure segmentation classes by generating said first classification data representative of said plurality of failure segmentation classes and associating said first classification data with each of said second set of pixels; and,
   said re-classification circuit is adapted to selectively re-classify said ones of said second set of pixels associated with said first classification data representative of said plurality of failure segmentation classes into said "other" segmentation class.

5. The apparatus according to claim 4 wherein:

said single channel segmentation circuit is operative in said failure mode to classify said second set of pixels into a plurality of black/white background segmentation classes; and, said re-classification circuit is adapted to selectively re-classify said ones of said second set of pixels associated with said first classification data representative of said black/white background classes into said "other" segmentation class based upon a comparison of said first set of pixels of said multi-channel color input image with a set of predetermined threshold values.

6. The apparatus according to claim 5 wherein said re-classification circuit is adapted to selectively re-classify said ones of said second set of pixels into an "other_light" segmentation class and an "other_dark" segmentation class based upon a comparison between said first set of pixels of said multi-channel color input image with a set of predetermined threshold values.

7. The apparatus according to claim 2 wherein:

said single channel segmentation circuit is operative to generate a confidence value signal together with said first classification data, the confidence value signal being representative of a relative certainty of said second set of pixels belonging to said plurality of segmentation classes; and, said re-classification circuit is responsive to said confidence value signal to selectively re-classify second ones of said second set of pixels into said "other" segmentation class by generating said second classification data representative of said "other" segmentation class and associating said second classification data with said second ones of second set of pixels.

8. The apparatus according to claim 7 wherein said re-classification circuit is responsive to a level of said confidence value signal relative to a predetermined threshold to selectively re-classify said second ones of said second set of pixels into said "other" segmentation class.

9. A method of re-classifying color image pixels previously classified by single channel segmentation, the method comprising the steps of:

converting a first set of pixels of a multi-channel color input image to a second set of pixels of a single channel representation of said multi-channel color input image;

classifying said second set of pixels into a plurality of segmentation classes by generating first classification data representative of said plurality of segmentation classes and associating said first classification data with each of said second set of pixels; and, based on a comparison of said first classification data associated with said ones of said second set of pixels relative to a set of predetermined classification data types, selectively re-classifying ones of said second set of pixels into an "other" segmentation class by generating second classification data representative of said "other" segmentation class and associating said second classification data with said ones of said second set of pixels.

10. The method according to claim 9 wherein the step of re-classifying includes re-classifying said ones of said second set of pixels into said "other" segmentation class when said first classification data is a black/white background data type.

11. The method according to claim 10 wherein:

said step of classifying said second set of pixels includes i) classifying said second set of pixels into a plurality of non-failure segmentation classes by generating said first classification data representative of said plurality of non-failure segmentation classes and associating said first classification data with each of said second set of pixels, and ii) classifying said second set of pixels into a plurality of failure segmentation classes by generating said first classification data representative of said plurality of failure segmentation classes and associating said first classification data with each of said second set of pixels; and, the step of re-classifying said ones of said second set of pixels includes re-classifying said ones of said second set of pixels associated with said first classification data representative of said plurality of failure segmentation classes into said "other" segmentation class.

12. The method according to claim 11 wherein:

the step of classifying said second set of pixels includes classifying said second set of pixels in said failure mode into a plurality of black/white background segmentation classes; and, the step of re-classifying said ones of said second set of pixels includes re-classifying said ones of said second set of pixels associated with said first classification data representative of said black/white background classes into said "other" segmentation class based upon a comparison of said first set of pixels of said multi-channel color input image with a set of predetermined threshold values.

13. The method according to claim 12 wherein the step of re-classifying said ones of said second set of pixels includes re-classifying said ones of said second set of pixels into an "other_light" segmentation class and an "other_dark" segmentation class based upon a comparison between said first set of pixels of said multi-channel color input image with a set of predetermined threshold values.

* * * * *

UNITED STATES PATENT AND TRADEMARK OFFICE
CERTIFICATE OF CORRECTION

PATENT NO.    : 6,535,633 B1
DATED         : March 18, 2003
INVENTOR(S)   : Schweid et al.

It is certified that error appears in the above-identified patent and that said Letters Patent is hereby corrected as shown below:

<u>Title page,</u>
Item [73], Assignee should be -- Xerox Corporation --, not "Bank One".

Signed and Sealed this

Fifth Day of August, 2003

JAMES E. ROGAN
*Director of the United States Patent and Trademark Office*